United States Patent [19]

Satterfield

[11] Patent Number: 4,491,091
[45] Date of Patent: Jan. 1, 1985

[54] ANIMAL TETHER

[76] Inventor: Audie L. Satterfield, Rte. One, Box 43-B, Oktaha, Okla. 74450

[21] Appl. No.: 540,551

[22] Filed: Oct. 11, 1983

[51] Int. Cl.³ ............................................... A01K 3/00
[52] U.S. Cl. ..................................... 119/117; 119/121
[58] Field of Search ................... 119/117, 121, 109, 96

[56] References Cited

U.S. PATENT DOCUMENTS

| 244,843 | 7/1881 | Battelle | 119/117 |
| 1,456,627 | 5/1923 | Delbridge | 119/117 |
| 2,551,540 | 5/1951 | Johnson | 119/121 |
| 2,790,419 | 4/1957 | Sullivan | 119/121 |
| 2,812,743 | 11/1957 | Dustin | 119/121 X |
| 3,508,525 | 4/1970 | Sawyer | 119/117 |

Primary Examiner—Hugh R. Chamblee
Attorney, Agent, or Firm—John J. Bryne; Bradford E. Kile; Kevin M. O'Brien

[57] ABSTRACT

A tangle free animal stake wherein means are provided to secure a plate to the earth's surface. A rotating member is provided of said plate to which a chain is attached having a plurality of universal swivels disposed intermediate the length of the chain.

3 Claims, 5 Drawing Figures

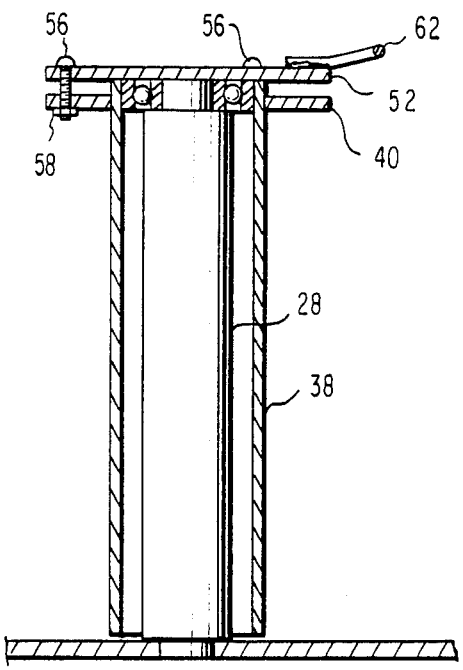
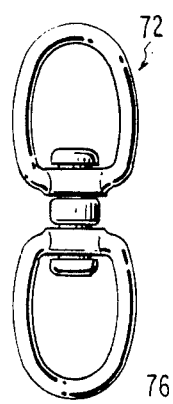
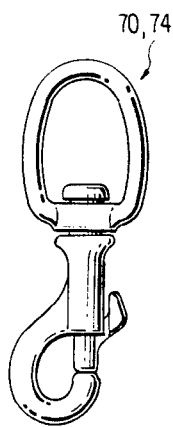
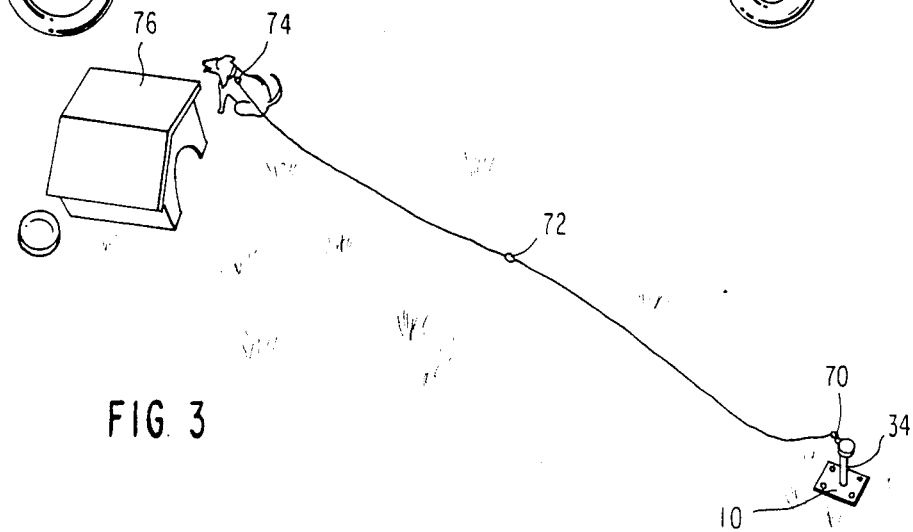

ANIMAL TETHER

BACKGROUND OF THE INVENTION

1. Field of Invention:

This invention relates to an improved animal tether having a tangle-free chain.

2. Description of the Prior Art:

The prior art is aware of many varieties of animal tethers. Many prior art devices have a securing stake to which a rotatable member is mounted. Tether chains are connected to the rotatable member.

PRINCIPAL OBJECTIVE OF THE INVENTION

A principle objective of this invention is to provide an animal tether having an anchor plate that can be affixed to the earth's surface with a good deal of firmness over which a rotating member is then placed. This member is rotatable without necessary effort on the part of a tethered animal. A tangle-free chain is provided having a swivel at either end thereof and one located intermediate the chain length.

Another important objective of the invention is to provide a device wherein the rotating member is easily removed from the anchor plate.

A further objective to the invention is to provide a tethering apparatus wherein the anchor plate is fully secured to the earth's surface prior to the placement of the rotating member thereon.

A still further objective of this invention is to provide an animal stake which is freely rotatable about a vertical axis and has a chain connected to the rotatable member. The chain has a plurality of swivels throughout it's length to prevent entanglements.

Another important objective to this invention is to provide a rugged, low cost mechanism of the type described which is substantially fool-proof in operation, is easily transportable, and will permit the animal to have relatively free movement about an area as permitted by the length of the chain.

Another objective of this invention is to provide a mechanism which can be easily located at a distance from the animal's house, or other obstruction, so that the chain will not become entangled so as to harm or restrict the animal.

Another important objective to this invention is to provide a swivel chain for an animal stake which will not become twisted or knotted due to the animal's movements and/or maneuvers.

A still further objective of the invention is to provide a mechanism to which the above swivel chain can be connected which will not have any protrusions upon which the chain can become entangled.

These and other objectives and advantages of the present invention will become apparent from the appended detail description of a preferred embodiment taken in conjunction with the accompanying in which:

BRIEF DESCRIPTION OF THE DRAWING

FIG. 2 is a cross-sectional view of the rotatable assembly and standard.

FIG. 3 is a layout showing the invention's use.

FIG. 4a is an enlarged elevational view of the swivels 70 and 74 and

FIG. 4b is an enlarged elevational view of swivel 72.

DESCRIPTION OF THE PREFERRED EMBODIMENT

Figure 1:
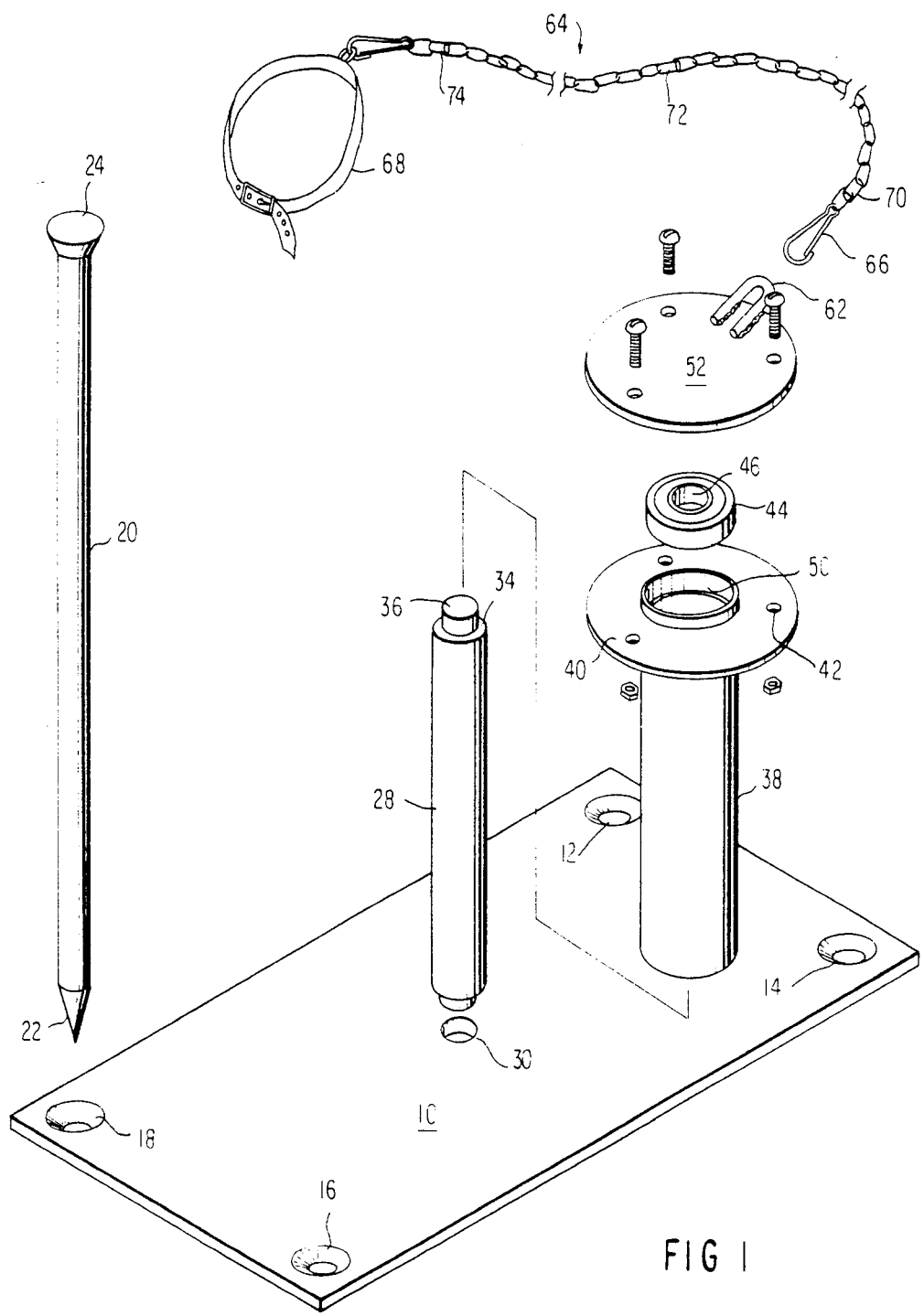
FIG. 1 is an exploded prespective view of the mounting assembly with the swivel chain.

Referring down to the drawings wherein like numerals indicate like parts, the numeral 10 indicates an anchor plate having apertures 12, 14, 16 and 18 disposed near its perimeter. The apertures are adapted to receive a plurality of stakes 20 having pointed ends 22 and headed ends 24. The heads are of a greater circumference than the apertures 12, 14, 16 and 18. The plate is secured to the ground by driving the stakes through the above-mentioned apertures. It should be noted that the taper on ends 24 mate with the complementary tapers of the apertures so as to receive the downwardly and inwardly inclined lower surfaces of the heads so as to reduce the possibility of entanglement by a tether chain with the hook.

A standard 28 extends upwardly from the plate and has its lower end secured to the plate by weld 30. At its upper end the standard 28 is provided with a boss 32 of less diameter than the standard 28 and thereby forms a horizontal annular ledge 34. A hollow rotator member 38 is received over the standard 28 with its lower end near the plate 10. Disposed slightly below the upper end of rotator 38 is an outwardly extending flange 40 having a plurality of apertures 42. An annular bearing member 44 has an inner circumference 46 received about the boss 32 and an outer circumference 48 engaged by the upper, inner surface 50 of rotator 38.

The length of the standard 28, including the boss 32, is the same as standard 28. The height of bearing 44 is approximately the height of boss 32. Therefore, when rotator 38 is slipped over boss 32, the top surface of the bearing is flush with the top surface of the rotator.

A cover 52 is disposed over the bearing member and has the same circumference and diameter as flange 40. The cover 52 is formed with apertures 54 of the same diameter and relative location as apertures 42. The apertures 54 and 42 are aligned so as to receive the bolts 56 which are used to secure the cover to the flange by way of nuts 58. The upper surface of cover 52 has a U-shaped hook 60 welded thereto.

Hook 62 is adapted for connection to the swivel chain 64 by way of a clasp 66. At the other end of chain 64, there is another clasp 65 that is connected to a dog collar, or other animal restrainer, 68. Intermediate the length of swivel chain 64 are three universal swivel joints 70, 72, and 74. Swivel joints 70 and 74 are disposed at the ends of the chain 64 and swivel joint 72 is disposed approximately midway of its length.

As above described, there has been provided a fixed standard number 28 about which a rotator 38 and its top cover 52 are rotatable with friction reduced by the bearing 44. Connected to this freely rotatable member is the chain 64 having three swivel joints throughout its length. The stakes 20 can be pounded into the ground so as to secure anchor plate 10. Thus, no pounding force is transmitted to the rotating elements.

FIG. 3 is a diagrammatic sketch of a desired stake location. The chain in this diagram can be approximately twenty feet in length and has swivels at either end and a third swivel intermediate of its length. The dog or other animal, cannot become entangled if the stake is placed a distance from the dog house 76, (or other obstruction such as a tree) to prevent the dog from wrapping about such an obstruction. The device should be connected to the ground so that the chain will not extend more than half way around an object such as a dog house.

In describing the invention, reference has been made to a preferred embodiment and illustrative advantages of the invention. Those skilled in the art, however, and familiar with the instant disclosure of the subject invention, may recognize additions, deletions, modifications, subsitutions and/or other changes which may fall within the purview of the subject invention and claims.

I claim:

1. An animal tether comprising:
   an anchor plate having a plurality of apertures formed near perimeter thereof,
   a plurality of stakes for reception in each of said apertures for securing said base plate to the earth's surface,
   a standard extending upwardly from said base plate and having an upper surface,
   a rotator member rotatably secured about said standard,
   a flange extending outwardly from said rotator near the upper end of said member,
   a boss extending upwardly from said standard and of a lesser diameter than said standard so as to form a ledge therewith,
   an annular bearing resting on said ledge and having an inner circumference about said boss and an outer diameter in engagement with the inner surface of said rotator member,
   a cover plate secured to said flange over said bearing,
   a hook on the upper surface on said cover plate, and
   a swivel chain having first and second ends one of which is affixed to said hook.

2. The invention of claim 1 wherein a plurality of universal swivel joints are disposed intermediate the length of said chain.

3. The invention of claim 2 wherein a first swivel is disposed near said first end, a second swivel is disposed near said second end and a third swivel is disposed approximately mid-way between.

* * * * *